(12) United States Patent
Talwalkar et al.

(10) Patent No.: US 11,276,248 B2
(45) Date of Patent: Mar. 15, 2022

(54) BODY-CENTRIC CONTENT POSITIONING RELATIVE TO THREE-DIMENSIONAL CONTAINER IN A MIXED REALITY ENVIRONMENT

(71) Applicant: Magic Leap, Inc., Plantation, FL (US)

(72) Inventors: Rohit Anil Talwalkar, Weston, FL (US); Cole Parker Heiner, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/111,154

(22) Filed: Dec. 3, 2020

(65) Prior Publication Data

US 2021/0248837 A1 Aug. 12, 2021

Related U.S. Application Data

(60) Provisional application No. 62/297,481, filed on Feb. 10, 2020.

(51) Int. Cl.
| | |
|---|---|
| *G06T 19/20* | (2011.01) |
| *G06F 3/01* | (2006.01) |
| *G06F 3/0481* | (2013.01) |
| *G06T 19/00* | (2011.01) |
| *G02B 27/01* | (2006.01) |
| *G02B 27/00* | (2006.01) |
| *G06F 3/04812* | (2022.01) |

(52) U.S. Cl.
CPC .......... *G06T 19/20* (2013.01); *G02B 27/0093* (2013.01); *G06F 3/011* (2013.01); *G06F 3/012* (2013.01); *G06F 3/04812* (2013.01); *G06T 19/003* (2013.01); *G06T 19/006* (2013.01); *G02B 27/017* (2013.01)

(58) Field of Classification Search
None
See application file for complete search history.

(56) References Cited

U.S. PATENT DOCUMENTS

| | | |
|---|---|---|
| 6,850,221 B1 | 2/2005 | Tickle |
| 10,078,919 B2 | 9/2018 | Powderly et al. |

(Continued)

OTHER PUBLICATIONS

International Search Report and Written Opinion for PCT Application No. PCT/US2020/063102, dated Feb. 8, 2021.

(Continued)

*Primary Examiner* — Michael J Cobb
(74) *Attorney, Agent, or Firm* — Knobbe, Martens, Olson & Bear, LLP

(57) ABSTRACT

A mixed reality system is disclosed that displays 3D content in a container referred to as a "prism," and also displays a related content item, such as an interactive menu for interacting with the 3D content. To maintain the content item accessible to the user, the system repositions the content item relative to the prism as the user moves relative to the prism. For example, in the context of an annotation toolbar, the system may move the toolbar from one surface of the prism to another in response to the user walking around the prism, entering the prism, or changing a head pose in the prism. In some embodiments, the content item is displayed in a reserved region in which the 3D content is not displayable, such that the 3D content does not interfere with the user's ability to view and access the content item.

22 Claims, 8 Drawing Sheets

(56) References Cited

U.S. PATENT DOCUMENTS

| | | | |
|---|---|---|---|
| 11,126,320 B1* | 9/2021 | Thompson | G06F 3/04847 |
| 11,202,006 B2* | 12/2021 | Sapienza | G06T 15/10 |
| 2006/0028436 A1 | 2/2006 | Armstrong | |
| 2007/0081123 A1 | 4/2007 | Lewis | |
| 2012/0127062 A1 | 5/2012 | Bar-Zeev et al. | |
| 2012/0162549 A1 | 6/2012 | Gao et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0267420 A1 | 9/2014 | Schowengerdt | |
| 2015/0016777 A1 | 1/2015 | Abovitz et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0309263 A2 | 10/2015 | Abovitz et al. | |
| 2015/0326570 A1 | 11/2015 | Publicover et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0246057 A1* | 8/2016 | Hasegawa | H04N 5/7491 |
| 2016/0283081 A1 | 9/2016 | Johnston et al. | |
| 2017/0309079 A1 | 10/2017 | Naples et al. | |
| 2017/0337742 A1 | 11/2017 | Powderly et al. | |
| 2018/0045963 A1 | 2/2018 | Hoover et al. | |
| 2018/0095649 A1 | 4/2018 | Valdivia et al. | |
| 2018/0096432 A1* | 4/2018 | Varma | G06Q 40/06 |
| 2018/0315248 A1* | 11/2018 | Bastov | G06F 3/011 |
| 2019/0121522 A1* | 4/2019 | Davis | G06F 3/04815 |
| 2019/0197785 A1 | 6/2019 | Tate-Gans et al. | |
| 2019/0362555 A1 | 11/2019 | Chen et al. | |
| 2021/0019935 A1* | 1/2021 | Neulander | G06T 15/506 |
| 2021/0096726 A1* | 4/2021 | Faulkner | G06F 3/04883 |

OTHER PUBLICATIONS

Roo, et al., "One Reality: Augmenting How the Physical World is Experienced by combining Multiple Mixed Reality Modalities," UIST 2017), ct. 22-25, Quebec City, Canada.

ARToolKit: https://web.archive.org/web/20051013062315/http://www.hitl.washington.edu:80/artoolkit/documentation/hardware.htm, archived Oct. 13, 2005.

Azuma, "a Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC—Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

BODY-CENTRIC CONTENT POSITIONING RELATIVE TO THREE-DIMENSIONAL CONTAINER IN A MIXED REALITY ENVIRONMENT

PRIORITY CLAIM

This application claims the benefit of U.S. Provisional Appl. No. 62/972,481, filed Feb. 10, 2020, the disclosure of which is hereby incorporated by reference.

TECHNICAL FIELD

The present disclosure relates to augmented reality and mixed reality systems, and more particularly, to user interfaces and processes for positioning content relative to a three-dimensional (3D) container or "prism" based on user movement.

BACKGROUND

Modern computing and display technologies have facilitated the development of systems for so called "virtual reality," "augmented reality," and "mixed reality" experiences, in which digitally reproduced images or portions thereof are presented to a user such that they appear real. A virtual reality, or "VR," scenario typically involves the presentation of digital or virtual image information without transparency to other actual real-world visual input. An augmented reality, or "AR," scenario typically involves the presentation of digital or virtual image information as an augmentation to visualization of the actual world around the user. A mixed reality, or "MR," scenario typically involves merging real and virtual worlds to produce new environments in which physical and virtual objects co-exist and interact in real time. As used herein, the term "mixed reality" is intended to encompass augmented reality.

As disclosed in U.S. Patent Pub. 2019/0197785, the disclosure of which is hereby incorporated by reference in its entirety, a mixed reality system may support the use of 3D bounded volumes or containers, referred to as "prisms," to manage the display of virtual content. A prism may have a rectangular or other shape, and may be positioned at a fixed location relative the user's real word environment. In some cases, multiple applications can render 3D content into the prism, and a universe application manages the display of this content.

SUMMARY

One problem encountered with the display of multiple content items in a 3D environment involves potential interference between different items of content, including content displayed in a prism. As one example, some mixed reality applications expose an interactive menu, such as a toolbar, that the user can interact with to create or modify content displayed in the 3D environment. As the user moves around, the display of this menu may overlap with, or appear behind, one or more content items, making interaction with the menu difficult. A related problem involves maintaining the interactive menu in a location at which the menu can easily be seen and accessed as the user moves around.

The present disclosure addresses the above and other problems by providing a display process for adjusting the display position and/or orientation of a content item relative to the boundaries of a prism (or other bounded 3D volume or container) as the user moves relative to the prism. The content item may, for example, be an interactive display object such as an interactive menu (e.g., a toolbar). As another example, the content item may be a notification, or a display object or pane that displays notifications.

In some embodiments or use cases, the process involves repositioning the content item from one surface of a prism to another surface of the prism based on the user's movement relative to the prism, and/or based on a change in the user's orientation (e.g., head pose). For instance, suppose a prism has a rectangular shape, and is of sufficient size that the user can walk into and out of the prism. If the user is initially standing outside the prism and facing the prism, an interactive menu (or other content item) may initially be displayed on the nearest vertical surface of the prism and with an outward facing orientation. If the user then walks into the prism through this surface, the interactive menu may be repositioned to the back surface (i.e., the surface directly across from and parallel to the walked-through surface), and displayed with an inward-facing orientation. (As discussed below, display positions falling between these parallel surfaces are also possible.) If the user then turns to the right or left to face one of the other two vertical surfaces of the rectangular prism, the interactive menu may be repositioned to the surface the user is facing. The process may thereby maintain the menu within the user's field of view, while reducing or eliminating interference between the menu and other content that is rendered in the prism.

The process may also involve reserving one or more portions of a prism or it's surfaces for the display of the content item, such that applications cannot render other types of content that interfere with the content item. For example, for a prism having multiple vertical surfaces, an upper portion or strip may be reserved for the display of interactive menus. This feature may further reduce or eliminate the likelihood that content rendered in the prism will obstruct the user's ability to access the menu or other content item.

The process, in some embodiments, advantageously facilitates the user's ability to access the content item while the user moves relative to the prism, yet keeps the content item "out of the way." For example, if the content item is an annotation toolbar for annotating 3D content rendered in the prism, the toolbar may move between multiple set locations and orientations relative to the prism as the user moves around such that (1) the toolbar generally remains visible to the user (e.g., within the user's field of view), and (2) the 3D content and annotations in the prism do not obstruct the user's access to the toolbar.

The process may be implemented in executable program instructions executed by one or more hardware processors of a mixed reality system. For example, the process may be implemented within the executable code of a universe application that runs on the mixed reality system and that manages the content rendered by other applications.

Neither this summary nor the following detailed description purports to define or limit the invention. The invention is defined by the claims.

Figure 1:
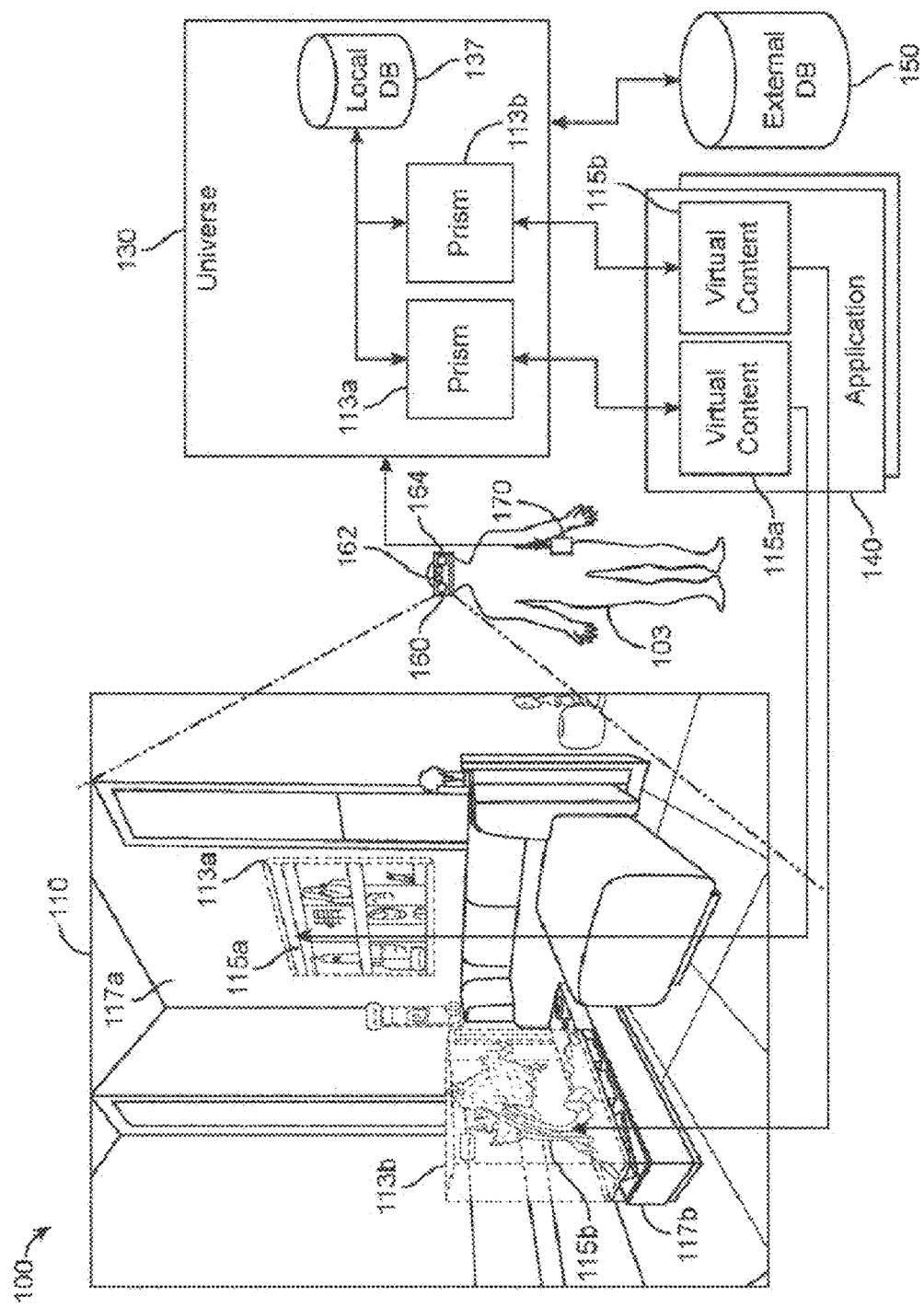
FIG. 1 illustrates one example of an environment in which the display processes of the present disclosure may be implemented.

Throughout the drawings, reference numbers may be re-used to indicate a correspondence between referenced elements. The drawings are provided to illustrate the example embodiments described herein and are not intended to limit the scope of the disclosure.

DETAILED DESCRIPTION

I. Terminology

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Head pose: the position and/or orientation of a wearable headset (or other head-mountable system such as a helmet) and, by proxy, of the user's head in the real world. Head pose may be determined using sensors such as inertial measurement units (IMUs), accelerometers, gyroscopes, etc. In some embodiments, a head pose ray that extends in the direction of the head pose may be used to interact with virtual objects. For example, when a user is pointing or looking at a prism or an object, the object or prism is intersected by the user's head pose ray. The orientation of a user may additionally or alternatively be determined based on eye pose, torso pose, or the pose of some other portion of the user's body.

Prism: A three-dimensional container or enclosure associated with mixed reality content or a mixed reality space. For example, a prism may contain one or more virtual content items that may be selectable by a user. The boundaries or surfaces of a prism may, but need not, be displayed to the user. A prism may spawn when an application is launched, and then may spawn sibling or child prisms to create flexible layouts. A prism typically serves a function similar to that of a window of a graphical user interface, but is a 3D object capable of displaying 3D content. A prism can be used in some environments to enable users to collaboratively share and manipulate 3D content.

Controller: a device configured to be held in a hand and used to interact with a mixed reality environment. For example, a controller may be used to interact with content items rendered with a prism, or with a menu associated with the prism. A controller may provide multiple degrees of freedom movement, such as 6DoF (Six Degrees of Freedom). In some embodiments, a user's hand or other real world object may be used instead of or in addition to a controller to provide user input to, for example, user interactable virtual content.

Controller pose: the position and/or orientation of a controller. A controller pose can be used to determine an area, volume, or point of a mixed reality environment at which the controller is pointing. In some embodiments, the controller pose is visually depicted to the user as a ray extending from the controller, enabling the user to point to and select content items with the controller.

II. Example Mixed Reality Environment with Prisms

FIG. 1 shows an example physical environment and computing system for managing and displaying content using prisms in a mixed reality system. The representative environment 100 includes a user's landscape 110 as viewed by a user 103 through a head-mounted system or headset 160. The user's landscape 110 is a 3D view of the world where user-placed content may be composited on top of the real world. The headset 160 may be any suitable head-mounted display system or device, and may, for example, resemble goggles, eyeglasses, or a helmet worn by the user.

The headset 160 includes a display 162 that displays various types of content that supplements the user's real-word view. In the example shown in FIG. 1, the user in standing in a room and is viewing a landscape 110 that includes a real-world view of the room supplemented with digital content 115a and 115b that is rendered in respective prisms 113a, 113b. The display 162 may be integrated into transparent or translucent lenses (or one such lens) of the headset, in which case the user's view through the lens(es) is supplemented with content rendered on the display 162. For example, the display 162 may be implemented using waveguides that are incorporated into lenses as disclosed in U.S. Patent Pub. 2018/0157398, the disclosure of which is hereby incorporated by reference. Alternatively, the display 162 may be an opaque display that displays a supplemented representation of the real-world view as captured by one or more outward facing cameras of the headset.

The headset 160 includes one or more types of sensors 164 for sensing the user's landscape, position and orientation. The sensors 164 may include, for example, one or more outward facing cameras or scanners for sensing physical objects and other surroundings, and may include one or more types of devices such as accelerometers, inertial measurement units, compasses, radio devices and/or gyroscopes for sensing head pose and location. The headset may also include one or more inward-facing cameras or other sensors for eye tracking. The tracked state of the user's eye(s) is referred to as "eye pose." The headset 160 may also include an audio speaker and microphone (not shown).

The representative environment 100 further includes a wearable computing device 170. The wearable computing device may include one or more hardware processors (not shown), a memory or other storage device 137 that stores application code and content, and one or more wireless transceivers for communicating with local and/or remote system components. Some or all of the circuitry of the wearable computing device may alternatively be integrated into the headset 160, or located in a stationary computing device that is not worn by the user. The wearable computing device 170 may communicate over a wireless network with a remote server or a local processing node. In some embodiments, the wearable computing device 170 is connected by a cable to the headset 160 and is configured to process video and sensor data received from the headset 160. As depicted by the external database (DB) 150 in FIG. 1, the wearable computing device 170 may access external storage over a network.

The term "computing system" is used herein to refer collectively to the various hardware computing components (hardware processors, storage devices, etc.) of the system, regardless of whether these components are contained in a single computing device or node or are distributed across multiple computing devices or nodes. In some embodiments, all of the processing components of the system are configured to be worn by the user, such that the computing system is a wearable computing system.

In the embodiment of FIG. 1, the wearable computing device 170 runs two types of applications, a universe application 130, and one or more additional applications 140 (sometimes called "landscape applications"). The applications 140 generate content, including content 115a, 115b that is rendered into prisms 113a, 113b. In the illustrated embodiment, each prism 113a, 113b is a bounded, rectangular volume and is pinned or anchored to a real-world object or structure. Prism 113a is anchored to a wall 117a, and displays virtual content 115a that appears to the user to be attached to the wall. Prism 113b is anchored to a table 117b, and displays virtual content 115b in the form of a 3D tree that appears to the user to sit on top of the table. As shown in additional figures and discussed below, some prisms may be sized and positioned to enable the user to walk into and out of the prism.

The universe application 130 is responsible for creating prisms 113a, 113b, and for managing the display of the digital content 115a, 115b. The universe application 130 may, for example, create a prism when an application 140 needs to render virtual content onto the user's landscape 110. Multiple applications 140 may render content into the same prism 113a, 113b. Each prism may have characteristics and properties that allow the universe application 130 to manage the placement and display of the content in the mixed reality environment by managing the prism itself. Although two different types of applications are shown in FIG. 1, the invention does not require two different types of applications. In addition, although the borders of the prisms are shown in FIG. 1 and the subsequent drawings, the borders may or may not be displayed to the user.

The mixed reality system may also include a controller 206 (see FIG. 2) that can be held by the user and used to perform various functions. The controller 206 may include one or more input devices or elements, such as buttons, a touchpad, a rotatable wheel, etc. In one embodiment, the controller also serves as a virtual laser pointer that can be used by the user to select objects. For example, the user can use the controller 206 to select menu options on a menu (such as the toolbar 208 shown in FIG. 2) by pointing the controller as the desired option. A virtual laser or ray (not shown) extending from the front of the controller may be displayed to the user to facilitate selection actions. In some embodiments, the user can alternatively select menu options using a finger, or using a head pose ray.

In some scenarios in which a user interacts with content displayed in a prism, it is desirable to expose to the user a content item that remains visible and accessible as the user walks around or into the prism. For example, if the user is creating, editing or annotating content in a prism, it may be desirable to display a menu (such as a toolbar) or other interactive content item in the vicinity of the prism, and to dynamically reposition this interactive content item so that it remains accessible as the user moves around. As another example, in the context of a collaborative session in which the user collaborates with other users to generate or modify content in a prism, it may be desirable to display, and dynamically reposition, a notification pane that displays information about the other participants.

The present disclosure addresses this issue by providing a process for dynamically repositioning a content item (such as, but not limited to, a menu or notification pane) in response to changes in the user's location and/or orientation. In some embodiments, the process involves repositioning the content item from one surface of the prism to another surface of the prism based on the user's movement relative to the prism, and/or based on a change in the user's orientation (e.g., head pose). The content item may, in some scenarios, also be positioned at other locations, such as a location within the prism. The process may also reorient (e.g., rotate horizontally by 180 degrees) the content item to maintain its proper orientation relative to the user.

In one embodiment, the process is implemented within the executable instructions of the universe application 130. The process may alternatively be implemented in the executable code of one of the applications 140, an operating system, or another type of software component.

III. Example Repositioning of Toolbar-Type Menu

Figure 2:
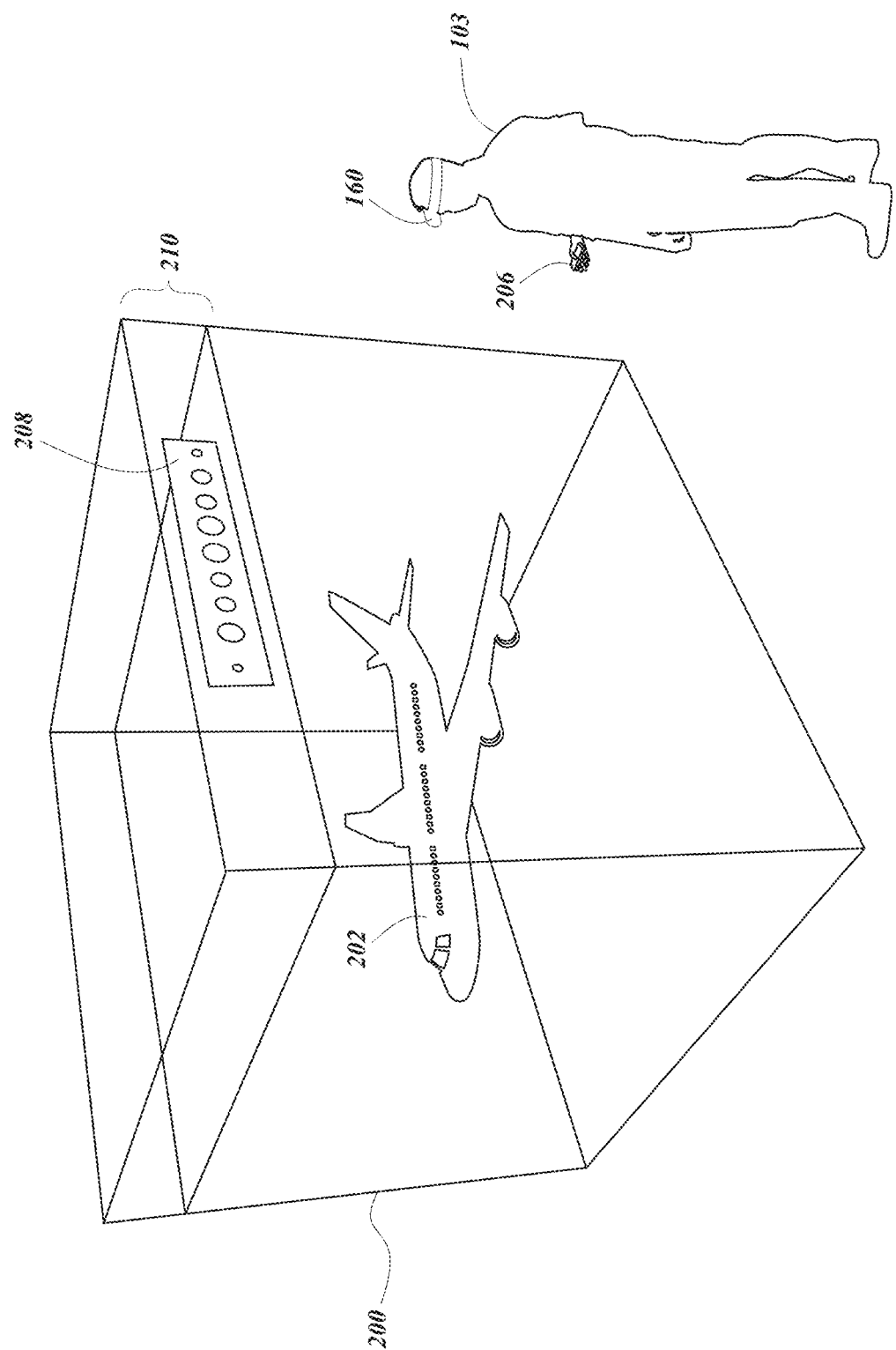
FIG. 2 illustrates an example scenario in which a user is viewing 3D content that has been rendered in a prism, and illustrates the positioning of an interactive menu according to one embodiment.
Figure 3:
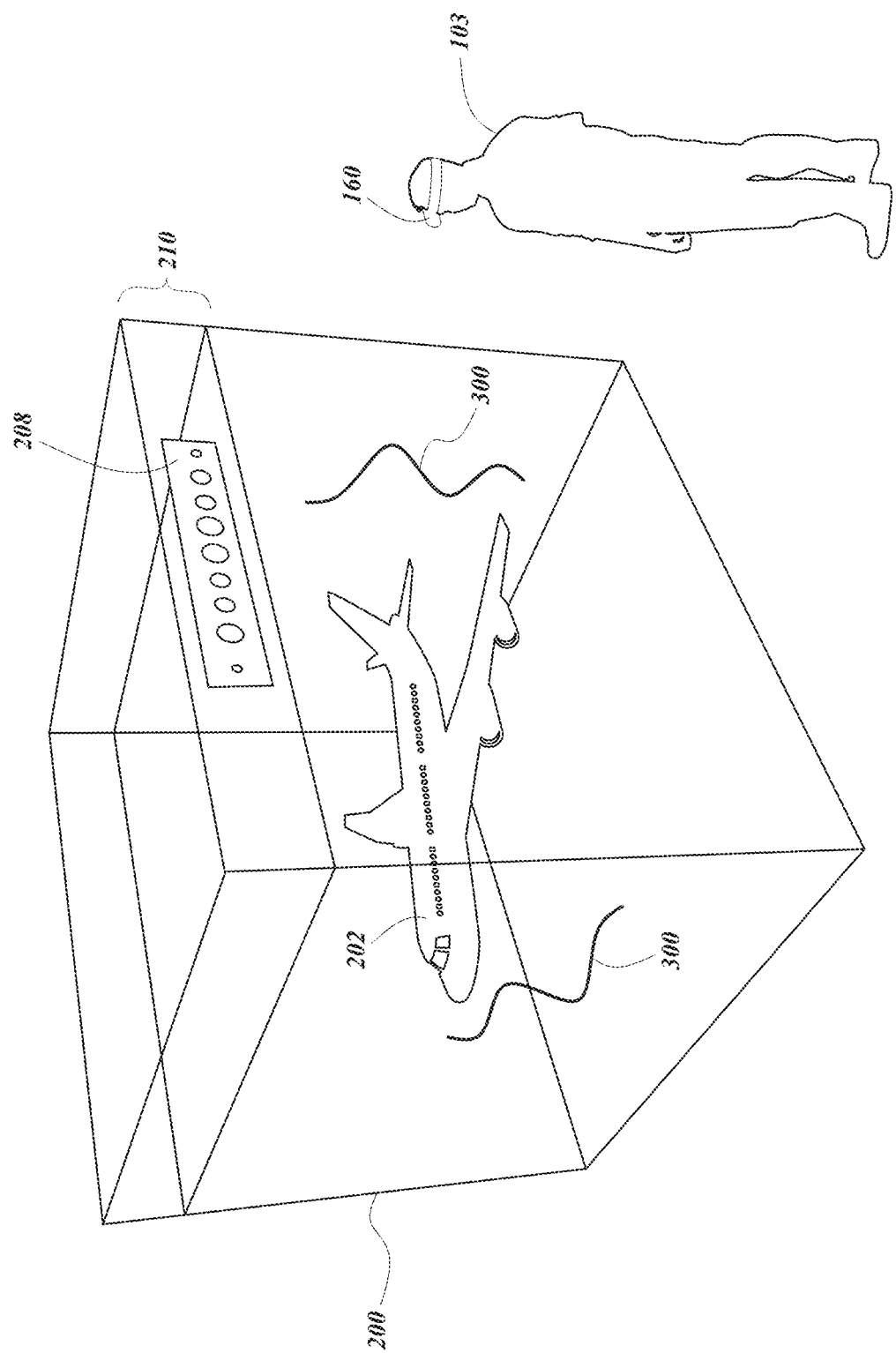
FIG. 3 illustrates the example of FIG. 2 after the user has added annotations with a drawing tool accessible using the interactive menu.

An example use case scenario will now be described with reference to FIGS. 2-5. In this use case scenario, the user is interacting with (e.g., creating, editing or annotating) a 3D model 202 of an airplane. The model 202 is positioned inside a prism 200, and the model's position and orientation remain fixed relative to the real/physical world as the user moves around. The content item in this example is an annotation menu, and specifically an annotation toolbar 208, that includes a plurality of selectable icons (shown as circles), each of which can be selected by the user by pointing the controller 206 at the icon. Different icons may represent different annotation tools, such as a drawing tool, a highlighting tool, an eraser tool, a text entry tool, etc. In other scenarios, the annotation menu may be in the form of a textual menu having multiple drop-down sub-menus. The annotation toolbar 208 is a 2D object, meaning that it appears flat to the user, although in some embodiments, the object may be 3D instead. The lines showing the boundaries or edges of the prism in FIGS. 2-5 typically are not displayed to the user, but in some embodiments may be displayed. In FIG. 2, the toolbar 208 may be described as being "displayed on" a surface of the prism, meaning that its position and orientation generally coincide with that of the prism's surface. The phrase "displayed on a surface" is not intended to imply that the surface itself is visible to the user. In some embodiments, "displayed on a surface" may mean that a plane created by the content item may be aligned with a plane created from a face of the prism.

In the example of FIGS. 2-5, the toolbar 208 is always displayed within an upper region 210 of the prism, although at different locations within this region depending on the user's location and orientation. In some embodiments, this upper region 210 is reserved for the display of menus (such as toolbars) and/or other types of content items that are dynamically repositioned as the user moves around. Thus, other types of content, such as the model 202, any annotations added by the user, and other types of user-created content, cannot be located in the upper region 210 in the illustrated embodiment.

This use of a reserved region 210 reduces or eliminates interference between the user-created content and the toolbar 208; for example, the user-created content does not obstruct the user's view of the toolbar 208 or the user's ability to select toolbar icons. Although a reserved region 210 is used in the example of FIGS. 2-5, the disclosed process can be implemented without using a reserved region. Further, a different portion of the prism, such as a lower portion or sides of the vertical surfaces, can be used as the reserved region.

In FIG. 2, the user 103 is standing outside and facing the prism 200. The annotation toolbar 208 is displayed with an outward-facing orientation in a centered position on the prism's surface (in the reserved region 210) that is closest to the user. This allows the user to easily view and access the toolbar 208 while viewing the model 202. The user can, for example, use the controller 206 to select a drawing tool from the annotation toolbar 208, and can then use the controller to draw on or around the model (as shown by the two wavy lines 300 in FIG. 3). In the illustrated embodiment, the toolbar 208 does not move along the surface on which it is displayed in FIGS. 2 and 3 as the user's head pose changes. In some embodiments and in an alternate embodiment described below, the toolbar can "slide" horizontally along the surface on which it is displayed.

Figure 4:
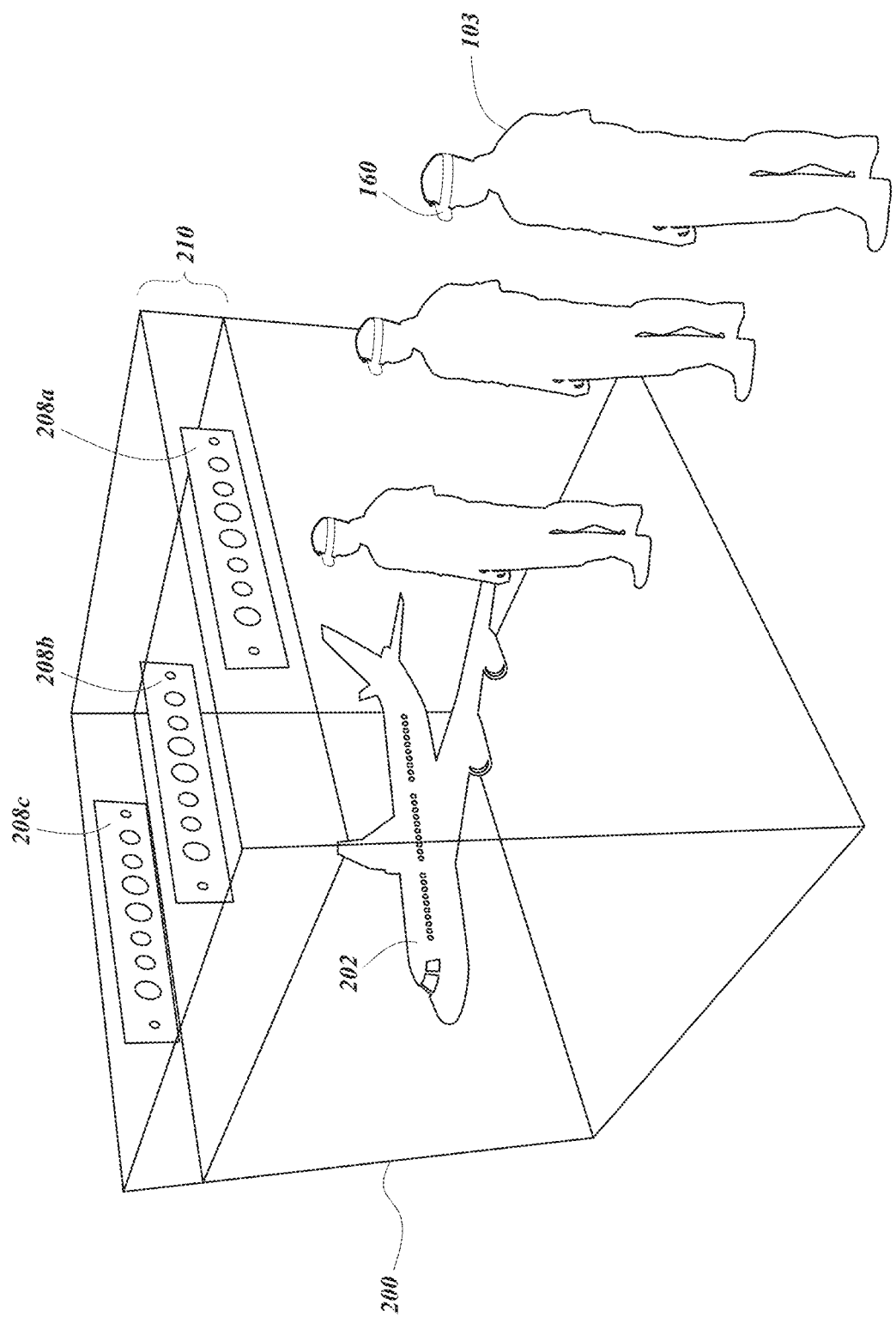
FIG. 4 illustrates how the interactive menu may be repositioned as the user walks toward and then into the prism in the example of FIG. 2.

FIG. 4 illustrates how the toolbar 208 may be repositioned as the user 103 walks toward and then into the prism 200. Initially, the toolbar is positioned at location 208a, which is the position shown in FIGS. 2 and 3. As the user approaches the prism 200, the toolbar 208 is repositioned to an intermediate position that falls half way between the front and back surfaces of the prism 200 from the user's perspective. This enables the toolbar 208 to remain visible and accessible to the user. The transition from location 208a to 208b, and the other location transitions described herein, may occur immediately or may occur more gradually (e.g., by using animations to show the toolbar moving from one location to another). After the user 103 steps into the prism 200 and continues walking forward, the annotation menu 208 is repositioned to the back surface of the prism, as shown by position 208c. The orientation of the toolbar remains unchanged, and the toolbar therefore has an inward-facing orientation in position 208c. If the user were to continue walking forward through the back surface, the toolbar may be rotated horizontally by 180 degrees so that it has an outward facing orientation.

Although only a single intermediate position 208b is shown in FIG. 4, multiple intermediate positions may be used. The number of intermediate positions used, if any, may be based on dimensions of the prism. In addition, the process may be implemented without the use of intermediate display positions; for example, the toolbar 208 may always be displayed on one of the prism's surfaces.

Figure 5:
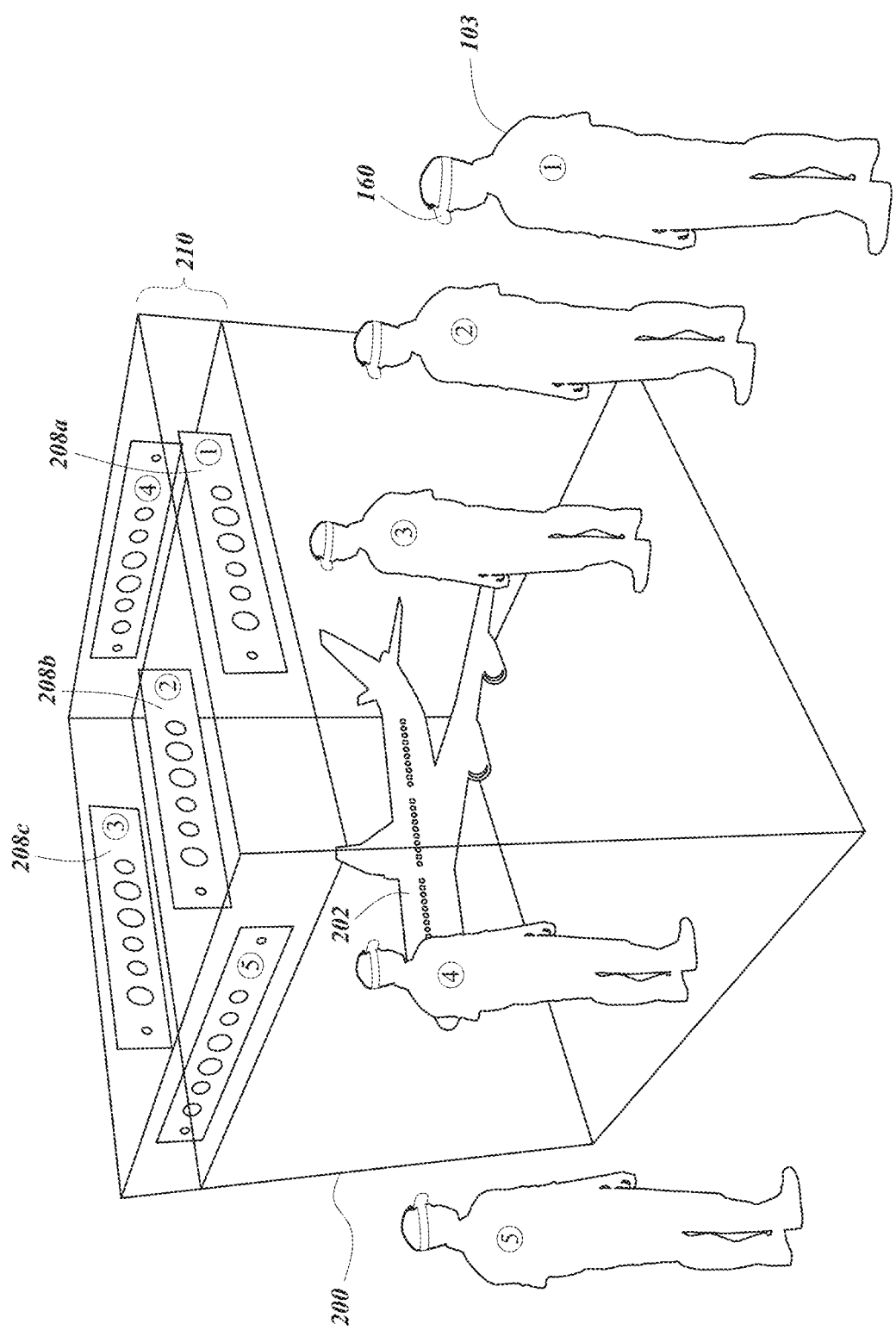
FIG. 5 illustrates five user positions/orientations relative to the prism in the example of FIG. 2, and illustrates five corresponding menu locations, according to one embodiment.

FIG. 5 illustrates five different user positions and orientations, and shows five corresponding toolbar locations and orientations. The first three examples shown in FIG. 5 are the same as those shown in FIG. 4. Example 4 shows the user 103 in the prism 200 facing a side surface of the prism, and shows the toolbar displayed on that side surface with an inward facing orientation. The toolbar may be repositioned to this location if, for example, the user turns ninety degrees to the right after walking into the prism. The user's orientation is determined by head pose, but may alternatively be determined based on eye pose, body or torso pose, or some other orientation measure. Example 5 in FIG. 5 shows the user 103 standing outside the prism 200 facing the other side surface, and shows the toolbar 208 positioned on that side surface with an outward facing orientation. In the illustrated examples of FIG. 5, the toolbar 208 is displayed in a fixed, centered position while it is displayed on any given surface of the prism or in an intermediate position, although in some embodiments, other positions may be used, such as right justified, left justified, offset from a corner or side of the area 210, etc.

As illustrated by these examples, in addition to maintaining the visibility and accessibility of the toolbar 208, the process seeks to maintain the toolbar positioned at a convenient distance from the user. For example, when the user is at user position 5 in FIG. 5, the toolbar could alternatively be displayed at toolbar position 4, but the significant distance between the user and toolbar would likely impede the user's ability to view and select from the toolbar, especially if the prism is large. In some embodiments, the process may seek to maintain the separation between the toolbar 208 and headset 160 within a selected range, such as 2 to 12 feet, 3 to 10 feet, or 4 to 8 feet. The toolbar may be removed from the user's landscape when the user is located more than a threshold distance from the prism 200.

The display process illustrated in FIGS. 2-5 may be adapted for use with other prism shapes and configurations. For example, if the prism is in the shape of a pentagon as viewed from the top, the process may select from one of the five vertical surfaces based on the user's position and orientation. If the prism includes curved surfaces, the display process may warp the toolbar or other 2D content item to match the curved prism surface on which it is displayed.

Figure 6:
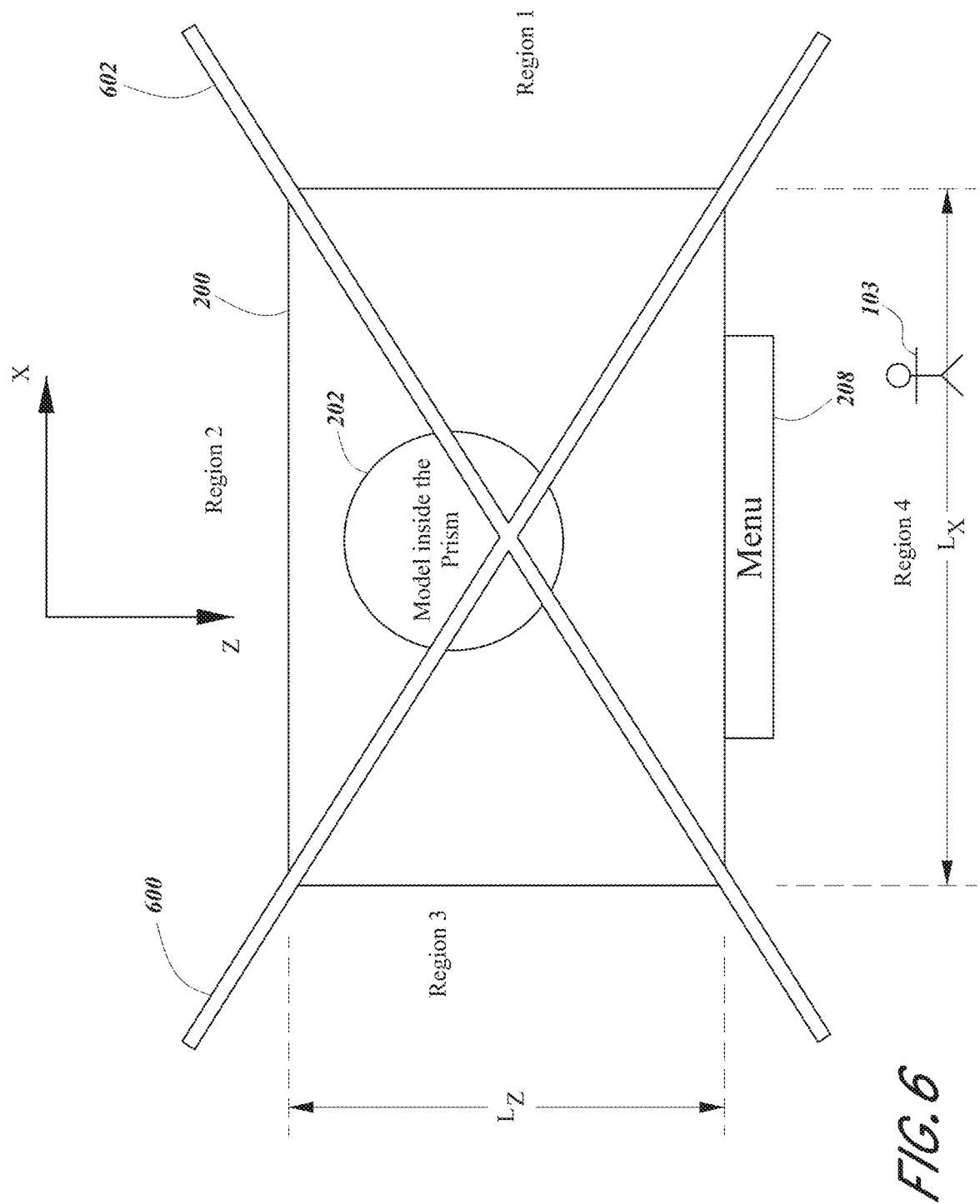
FIG. 6 is a top down (overhead) view of the prism of FIGS. 2-5, and illustrates a coordinate system, dimension variables, and region borders that may be used to programmatically select the position and orientation of an interactive menu or other content item.

FIG. 6 illustrates a coordinate system and associated references that may be used by the system to programmatically select the toolbar/menu display positions in the example of FIGS. 2-5. The drawing includes a top-down view of the prism 200, and shows the X and Z axes of the coordinate system relative to the prism. The Y axis is a vertical axis and thus is not shown. The center of the prism is the point at which X=0 and Z=0. The prism's length in the X direction is represented as $L_X$, and the prism's length in the Z direction is represented as $L_Z$. Two region dividing lines or borders 600, 602 are shown, each of which intersects with two opposing vertices of the rectangle. These dividing lines are used to define four regions, shown as regions 1, 2, 3 and 4. Each of these regions is further subdivided into an interior portion (i.e., inside the prism) and an exterior region. In this drawing, the user 103 is shown in the exterior portion of region 4, and the toolbar (menu) 208 is positioned on the prism surface of region 4 with an outward facing orientation. The toolbar may remain fixed in this location as long as the user remains in the exterior portion of region 4, or within a threshold distance from the line dividing the interior and exterior regions.

In one embodiment, the toolbar 208 is only displayed on vertical surfaces of the prism (no intermediate display positions are used), and is displayed according to the following rules: (1) If the user is outside the prism, the toolbar is displayed with an outward facing orientation on the surface falling in the region in which the user is located; (2) if the user is inside the prism, the toolbar is displayed with an inward facing orientation on the surface the user is facing (e.g., the surface intersected by the direction vector or ray representing the user's head pose). These rules may be appropriately modified or augmented to support the display of one or more intermediate display positions, such as position 2 of FIG. 5.

Figure 7A:
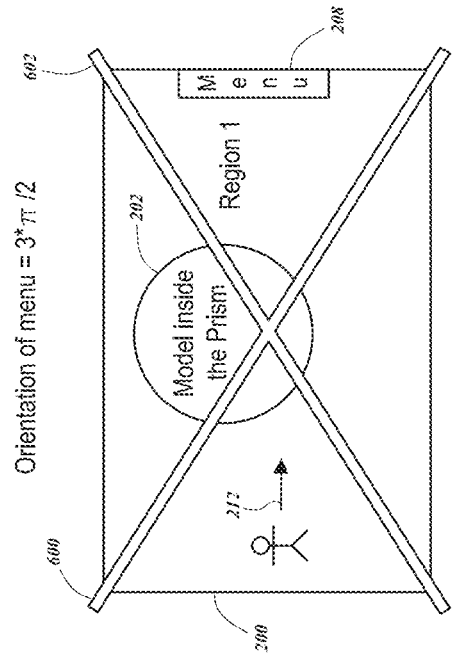
FIGS. 7A-7D illustrate the programmatic selection of the menu position and orientation for each of four user orientations within the prism.
Figure 7B:
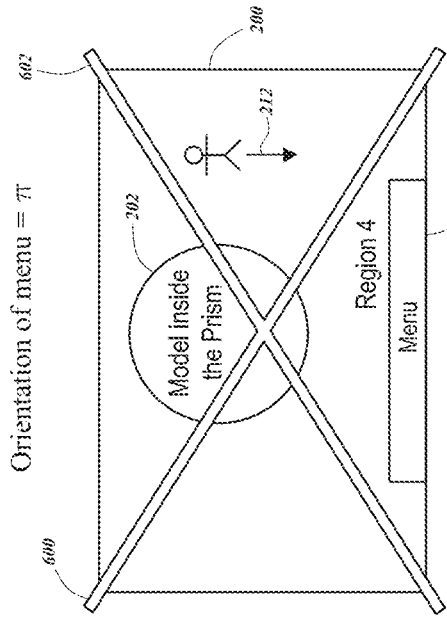
Figure 7C:
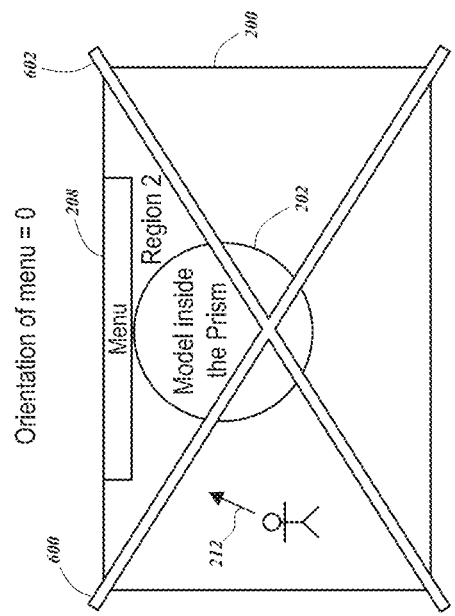
Figure 7D:
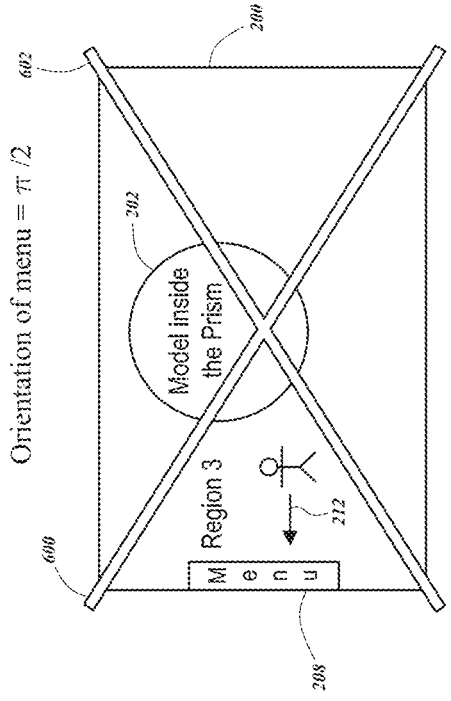

FIGS. 7A-7D show four interior user locations and orientations, and four corresponding menu/toolbar locations. The direction vectors 212 in these drawings represent user direction or pose vectors, such as head pose vectors. In each case, the menu 208 is displayed with an inward facing orientation on the vertical prism surface that is intersected by the direction vector 212, without regard to which of the four interior regions the user is in. In FIG. 7A, the user is facing the surface of region 2, and the menu 208 is displayed on that surface with a menu angle of zero. In FIG. 7B, the user is facing the surface of region 1, and the menu 208 is displayed on that surface with a menu angle of $3\pi/2$ radians or 270 degrees. In FIG. 7C, the user is facing the surface of region 3, and the menu 208 is displayed on that surface with an angle of $\pi/2$ radians or 90 degrees. In FIG. 7D, the user is facing the surface of region 4, and the menu 208 is displayed on that surface with an angle of $\pi$ radians or 180 degrees. In other words, in some embodiments, the menu 208 may rotate to face the user, regardless of where the user is located. As explained above, one or more intermediate display locations may also be used when the user is in or close to the prism; for example, in FIG. 7B, if the distance between the user and the surface of region 1 exceeds a threshold, the menu 208 may alternatively be displayed in an intermediate position falling between the user and that surface.

As mentioned above, when a change in the user's orientation and/or location triggers a change in the location and/or orientation of the toolbar 208, an animation may optionally be used to show the toolbar moving and/or rotating to its new location and/or orientation. To further improve the user experience, a hysteresis type function may be used to prevent the toolbar 208 from "jumping" back and forth between locations in short time intervals in response to small user movements. For example, in FIG. 6, if the user were to stand along the border 600 between the exterior portions of regions 1 and 4, the hysteresis function might prevent the menu 208 from jumping between the surfaces of regions 1 and 4 in response to small user movements. The thickness of each of the borders 600 and 602 in FIG. 6 represents the degree of hysteresis used. When the user is inside the prism, the hysteresis function may prevent the menu 208 from rapidly moving back and forth between surfaces when the user is facing a corner of the prism. Hysteresis may additionally or alternatively be implemented by imposing a time-based restriction that prevents the menu 208 from being relocated again for some time period (e.g., 1 second or 2 seconds) once it's location is changed.

Figure 8:
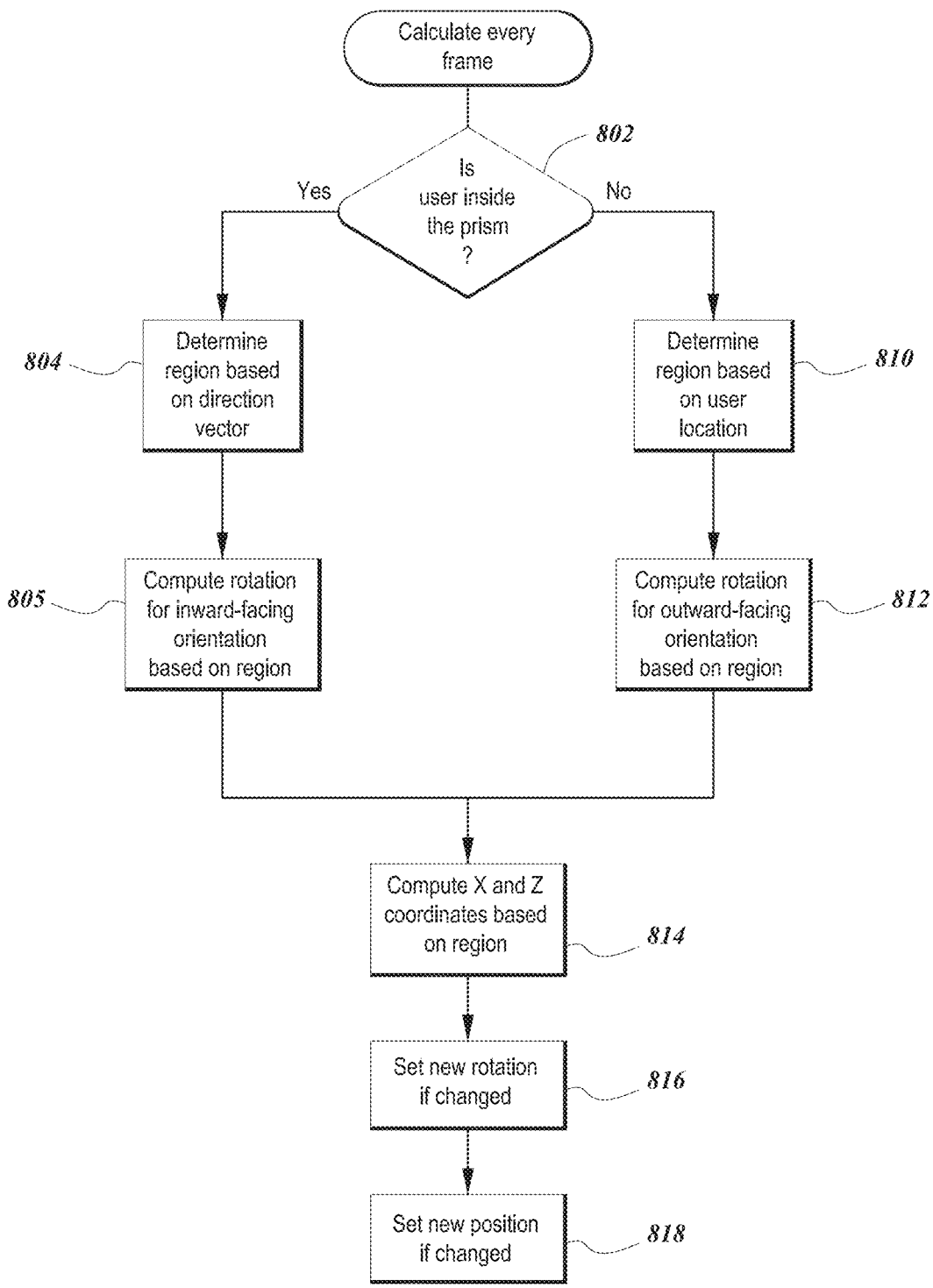
FIG. 8 illustrates one embodiment of a process for repositioning a content item in response to user movement.

FIG. 8 illustrates a process that may be used to relocate and reorient a toolbar, another type of menu, or another type of content item based on user movement. The process may be implemented in program code executed by the computing system (e.g., the wearable computing device 170 and/or another processing component of the system). For example, the process may be implemented in program code of the universe application 130 (FIG. 1) or another application 140. The process is illustrated as being executed every frame (e.g., sixty times per second if a frame rate of 60 frames-per-second is used), but may be executed less frequently (e.g., every other or every third frame). In decision block 802 of FIG. 8, the process determines whether the user is inside the prism 200 based on the coordinates of the user and the coordinates and dimensions of the prism 200. The user's coordinates may be based on data collected or generated by the headset 160 (or in some embodiments, by the controller 206 or another component).

If the user is in the prism, the region in which the content item will be displayed is determined based on a direction vector (block 804) representing the direction the user is facing, as described above with reference to FIGS. 7A-7D. The direction vector may be based on head pose, but could alternatively be based on eye pose, torso pose, or some other pose or orientation measure. In block 805, the process uses the determined region to compute the rotation for displaying the content item on the region's surface with an inward facing orientation.

If the user is outside the prism, the process determines the region based on the user's location (block 810), as discussed with reference to FIG. 6. In block 812, the process then computes the rotation for displaying the content item with an outward-facing orientation (i.e. facing toward the user) on the surface of the identified region.

In block 814, the process computes the X and Z coordinates based on the region. For example, the process may compute these coordinates such that the content item will be centered on the identified surface. The Y coordinate may be a fixed value that corresponds to a reserved region 210, as described above. In blocks 816 and 818, the process sets the new rotation if it has changed, and sets the new position (X and Z coordinates) if it has changed. As mentioned above, an animation may be executed to display the content item moving to its new position and orientation.

The following equations may be used to determine the regions in blocks 804 and 810 of FIG. 8, where X and Z are coordinates, $L_Z$ is the prism length in the Z direction (see FIG. 6), $L_X$ is the prism length in the X direction, and $\delta$ is an optional hysteresis value:

$A = X(L_Z)$ $B = Z(L_X)$ $\text{Region1} = (A-B) > \delta \text{ AND } (A+B) > \delta$ $\text{Region2} = (A-B) > \delta \text{ AND } (A+B) < -\delta$ $\text{Region3} = (A-B) < -\delta \text{ AND } (A+B) < -\delta$ $\text{Region4} = (A-B) < -\delta \text{ AND } (A+B) > \delta$ Region0 = locations not falling in any of Regions1-4

The hysteresis value $\delta$ may, for example, be set to a value between 0 and 0.8, with a value of zero providing no hysteresis, and larger values providing more hysteresis. Region 0 is the region represented by the region dividing borders 600 and 602 shown in FIG. 6, and the thickness or width of these bars corresponds to $\delta$. To implement the hysteresis function in FIG. 8, when the region determined in block 804 or 810 is Region 0, no action is taken (i.e., the rotation and position are not updated in blocks 816 and 818). Table 1 shows the angles used to display the content item for each of the five regions when the user is outside the prism, and Table 2 shows the angles used when the user is inside the prism.

TABLE 1

| Region | Content item angle (around Y, from X) |
|---|---|
| 1 | $\pi/2$ |
| 2 | $\pi$ |
| 3 | $3\pi/2$ |

TABLE 1-continued

| Region | Content item angle (around Y, from X) |
|---|---|
| 4 | 0 |
| 0 | No action-location and rotation of content item remain unchanged. |

TABLE 2

| Region | Content item angle (around Y, from X) |
|---|---|
| 1 | 3π/2 |
| 2 | 0 |
| 3 | π/2 |
| 4 | π |
| 0 | No action-location and rotation of content item remain unchanged. |

The process of FIG. 8 may be appropriately modified to enable the content item to be displayed in intermediate positions between surfaces, as described above.

As will be apparent, the display processes described above can be varied in numerous ways. For example, in one embodiment, when the user is in the prism 200, the toolbar 208 may "slide" from side-to-side (horizontally) along the prism surface the user is facing as the user moves, so that the toolbar remains directly in front of the user (based, e.g., on head pose) in the reserved region 210. When the toolbar reaches a corner of the prism, it may either jump to the adjacent surface or may fold by 90 degrees such that it can continue to slide while a portion of the toolbar is displayed on one surface and the remaining portion is displayed on the adjacent surface. Side-to-side movement may also be implemented when the user is outside the prism.

In another embodiment, when the user is inside the prism 200, the toolbar 208 or other content item may be persistently displayed in a centered location on all four vertical surfaces, or on two opposite surfaces; thus, the toolbar 208 in this embodiment is not repositioned while the user is in the prism, and the user can look at and use any one of the multiple instances of the toolbar. As another example, the size of the toolbar can be decreased as the user moves toward the surface on which it is displayed, and can be increased as the user moves away from the surface.

IV. Conclusion

All of the processes and tasks described herein may be performed and fully automated by a computing system that includes or more computing devices (e.g., the wearable computing device 170, the headset 160, and/or other devices). Each such computing device typically includes a hardware processor (or multiple hardware processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computing system. Where the computing system includes multiple computing devices, these devices may, but need not, be co-located.

The systems and methods of the disclosure each have several innovative aspects, no single one of which is solely responsible or required for the desirable attributes disclosed herein. The various features and processes described above may be used independently of one another, or may be combined in various ways. All possible combinations and sub-combinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A computerized process performed under control of program instructions executed by one or more hardware processors of a mixed reality system, the process comprising:

displaying to a user, on display of a headset worn by the user, three-dimensional (3D) content that is contained within a prism, the prism having multiple surfaces that define a volume in which the 3D content is displayed;

displaying, on a first surface of the prism, a content item that provides functionality for the user to interact with the 3D content;

sensing movement of the user relative to the prism, said movement comprising at least one of (1) movement of the user from outside the prism to inside the prism, or (2) a change in a pose of the user while the user is inside the prism; and in response to the sensed movement, repositioning the content item to a second surface of the prism such that the content item has an inward-facing orientation, said second surface selected based at least partly on a pose vector of the user while the user is inside the prism, wherein the first and second surfaces are different surfaces of the prism.

2. The process of claim 1, wherein the sensed movement comprises a change in a pose of the user while the user is inside the prism.

3. The process of claim 1, wherein the sensed movement comprises a change in a head pose of the user while the user is inside the prism, and the content item is repositioned to remain in a field of view of the user.

4. The process of claim 1, wherein the first and second surfaces are vertical surfaces that are perpendicular to each other.

5. The process of claim 4, wherein repositioning the content item comprises rotating the content item by 90 degrees.

6. The process of claim 1, wherein the first and second surfaces are parallel to each other, and wherein the sensed movement comprises movement of the user from outside the prism to inside the prism through the first surface.

7. The process of claim 6, where repositioning the content item comprises, in response to the movement of the user from outside to inside the prism, displaying the content item at an intermediate position falling between the first and second surfaces.

8. The process of claim 1, wherein the content item is a toolbar having icons that are selectable by the user.

9. The process of claim 1, wherein the content item is an annotation menu that provides user functionality for annotating the 3D content.

10. A computerized process performed under control of program instructions executed by one or more hardware processors of a mixed reality system, the process comprising:

displaying to a user, on display of a headset worn by the user, three-dimensional (3D) content that is contained within a prism, the prism having multiple surfaces that define a volume in which the 3D content is displayed;

displaying, on a first surface of the prism, a content item that provides functionality for the user to interact with the 3D content;

sensing movement of the user relative to the prism; and in response to the sensed movement, repositioning the content item to a second surface of the prism;

wherein the prism comprises a reserved region that is reserved for content other than said 3D content, and wherein the process comprises displaying the content item on the first and second surfaces in the reserved region.

11. A computerized process performed under control of program instructions executed by one or more hardware processors of a mixed reality system, the process comprising:

displaying to a user, on display of a headset worn by the user, three-dimensional (3D) content that is contained within a prism, the prism having multiple surfaces that define a volume in which the 3D content is displayed;

displaying, on a first surface of the prism, a content item that provides functionality for the user to interact with the 3D content;

sensing movement of the user relative to the prism; and in response to the sensed movement, repositioning the content item to a second surface of the prism;

wherein the process comprises determining a display position of the content item based on user location when the user is located outside the prism, and determining a display position of the content item based on a pose of the user when the user is located inside the prism.

12. A mixed reality system, comprising:

a head-mountable display configured to be worn by a user;

one or more sensors configured to sense movement of the user; and a computing system comprising one or more processors, the computing system programmed with executable instructions to display, on the head-mountable display, three-dimensional (3D) content that is contained within a prism, the prism having surfaces that define a bounded volume, the prism having a fixed location in a real-world environment of the user;

wherein the computing system is configured to display a content item on a first surface of the prism, and to maintain the content item accessible to the user by repositioning the content item to a second surface of the prism in response to sensed movement of the user relative to the prism, the sensed movement comprising at least one of (1) movement of the user from outside the prism to inside the prism, or (2) a change in a pose of the user while the user is inside the prism, wherein the second surface is selected based at least partly on a pose vector of the user while the user is inside the prism, and wherein repositioning the content item comprises displaying the content item on the second surface with an inward-facing orientation, said first and second surfaces being different surfaces of the prism.

13. The mixed reality system of claim 12, wherein the content item is an interactive menu.

14. The mixed reality system of claim 12, wherein the sensed movement comprises a change in a location of the user relative to the prism.

15. The mixed reality system of claim 12, wherein the sensed movement comprises movement of the user from outside the prism to inside the prism.

16. The mixed reality system of claim 12, wherein the sensed movement comprises a change in a pose of the user while the user is inside the prism.

17. The mixed reality system of claim 12, wherein the computing system runs a first application that renders the 3D content, and runs a second application that manages a display of the 3D content in the prism.

18. A mixed reality system, comprising:

a head-mountable display configured to be worn by a user;

one or more sensors configured to sense movement of the user; and a computing system comprising one or more processors, the computing system programmed with executable instructions to display, on the head-mountable display, three-dimensional (3D) content that is contained within a prism, the prism having surfaces that define a bounded volume, the prism having a fixed location in a real-world environment of the user;

wherein the computing system is configured to display a content item on a first surface of the prism, and to maintain the content item accessible to the user by repositioning the content item to a second surface of the prism in response to sensed movement of the user relative to the prism;

wherein the prism comprises a reserved region that is reserved for a display of content other than said 3D content, and wherein the computing system is programmed to display the content item on the first and second surfaces in the reserved region.

19. A mixed reality system, comprising:

a head-mountable display configured to be worn by a user;

one or more sensors configured to sense movement of the user; and a computing system comprising one or more processors, the computing system programmed with executable instructions to display, on the head-mountable display, three-dimensional (3D) content that is contained within a prism, the prism having surfaces that define a bounded volume, the prism having a fixed location in a real-world environment of the user;

wherein the computing system is configured to display a content item on a first surface of the prism, and to maintain the content item accessible to the user by repositioning the content item to a second surface of the prism in response to sensed movement of the user relative to the prism;

wherein the computing system is programmed to determine a display position of the content item based on user location when the user is located outside the prism, and to determine a display position of the content item based on a pose of the user when the user is located inside the prism.

20. Non-transitory computer storage comprising one or more storage devices, the non-transitory computer storage storing executable program instructions that direct a mixed reality system to perform a process that comprises:

displaying to a user, on display of a headset worn by the user, three-dimensional (3D) content that is contained within a prism, the prism having multiple surfaces that define a volume in which the 3D content is displayed;

displaying, on a first surface of the prism, a content item that provides functionality for the user to interact with the 3D content;

detecting movement of the user relative to the prism, the movement comprising at least one of (1) movement of the user from outside the prism to inside the prism, and (2) a change in a pose of the user while the user is inside the prism; and in response to the detected movement, repositioning the content item to a second surface of the prism such that the content item remains in a field of view of the user and is displayed with an inward-facing orientation, said second surface selected based at least partly on a pose vector of the user while the user is inside the prism, wherein the first and second surfaces are different surfaces of the prism.

21. The non-transitory computer storage of claim 20, wherein the movement comprises movement of the user from outside the prism to inside the prism.

22. The non-transitory computer storage of claim 20, wherein the movement comprises a change in a pose of the user while the user is inside the prism.

* * * * *

UNITED STATES PATENT AND TRADEMARK OFFICE
CERTIFICATE OF CORRECTION

PATENT NO. : 11,276,248 B2
APPLICATION NO. : 17/111154
DATED : March 15, 2022
INVENTOR(S) : Rohit Anil Talwalkar et al.

It is certified that error appears in the above-identified patent and that said Letters Patent is hereby corrected as shown below:

On the Title Page

At Column 1, Item (60) under "Related U.S. Application Data," delete "62/297,481" and insert --62/972,481--.

Signed and Sealed this
Twenty-eighth Day of June, 2022

Katherine Kelly Vidal
*Director of the United States Patent and Trademark Office*